United States Patent [19]

Muroi et al.

[11] Patent Number: 5,021,810

[45] Date of Patent: Jun. 4, 1991

[54] PRINTING MACHINE

[75] Inventors: Katsumi Muroi; Kenji Okuna; Hidefumi Otsuka, all of Ibaraki; Kastubumi Ouchi, Chigasaki; Tsutomu Iimura, Tachikawa; Ryoji Kojima, Katsuta, all of Japan

[73] Assignees: Hitachi, Ltd.; Hitachi Koki Co., Ltd.; Hitachi Metals, Ltd., all of Tokyo, Japan

[21] Appl. No.: 542,987

[22] Filed: Jun. 25, 1990

[30] Foreign Application Priority Data

Jul. 26, 1989 [JP] Japan .............................. 01-193353

[51] Int. Cl.[5] .............................................. G01D 15/06

[52] U.S. Cl. ...................................................... 346/155

[58] Field of Search .............................. 346/153.1, 155

[56] References Cited

U.S. PATENT DOCUMENTS 4,763,143 8/1988 Ohba et al. ........................ 346/160.1

4,777,499 10/1988 Okuma et al. .................. 346/155 X

*Primary Examiner*—George H. Miller, Jr.

*Attorney, Agent, or Firm*—Antonelli, Terry, Stout & Kraus

[57] ABSTRACT

A printing machine according to the present invention, comprises electrically conductive and magnetically inductive printing toner, an array of electrode-needles contacting with toner, each of the electrode-needles arranged apart from the adjacent electrode-needles in the array and individually energized in accordance with a desired printing pattern to electrify the toner communicating electrically with the energized electrode-needle, recording means including an electrically conductive portion and an insulating surface which extends on the electrically conductive portion and is arranged away from the array of electrode-needles to face thereto and to contact with the toner arranged between the electrode-needles and the insulating surface, the voltage applied to the electrically conductive portion being positive when the voltage applied to the energized electrode-needles is negative or the voltage applied to the electrically conductive portion being negative when the voltage applied to the energized electrode-needles is positive so that the toner electrified by the energized electrode-needle is attracted and attached to the insulating surface by the electrically conductive portion, the insulating surface moving in relation to the array of electrode-needles so that the toner is attached to an area of the insulating surface, magnetic means for attracting the magnetically inductive printing toner to form toner chains between the array of the electrode-needles and the insulating surface, and transferring means for transferring the toner from the insulating surface to a work piece, wherein longitudinally extending surfaces of the electrode-needles face to the insulating surface to electrify the printing toner arranged between the electrode-needles and the insulating surface.

4 Claims, 4 Drawing Sheets

PRINTING MACHINE

BACKGROUND OF THE INVENTION AND RELATED ART STATEMENT

The present invention relates to a printing machine in which electrically conductive and magnetically inductive printing toner is attached onto a printing drum and subsequently the attached printing toner is transferred onto a work piece, more particularly the printing toner is attached onto the printing drum with coulombic force.

In a conventional printing machine of above mentioned type, the printing toner is electrified and the electrified printing toner is spread on the printing drum. Subsequently, a part of the spread and electrified printing toner is removed from the printing drum by selectively energized electrodes which face to the printing drum and are arranged along a straight line parallel to an rotational axis of the printing drum, so that a desired printing pattern is formed on the printing drum. An example of the electrodes as described above is shown in FIG. 7 (refer to Japanese Unexamined Patent Application Laid-open Publications No. 61-144365 and No. 61-152464). The electrodes 202 are made of an electrically conductive and magnetically inductive material, face to the printing drum and are arranged parallel to each other with a constant distance there-between on a ceramic base plate 201. The electrodes 202 are energized through wires 208 by a driving IC 203 mounted on the ceramic base plate 201. The wires 208 are protected by a shield member (not shown). The electrodes 202 and the ceramic base plate 201 are arranged between two magnets 207. Spaces between the electrodes 202 are formed by electrolytic etching process and the electrodes 202 are adhered onto the ceramic base plate 201. The printing drum is made of aluminum or aluminum alloy and has an outer peripheral anodized surface which is hydrated or whose small holes are filled with tetrafluoride. Since the electrolytic etching proceeds not in one direction but in the three dimensions, it is necessary for the thickness of material of the electrodes 202 to be small to form narrow spaces between the electrodes 202 when the density of the electrodes 202 is high and the spaces between the electrodes 202 must be small. Therefore, each of the electrodes 202 has small area contacting with the printing toner. Since the diameter of each grain of the printing toner is 5 to 50 microns, the number of the grains contacting with each of the electrodes 202 is small and electrical contact resistance between the printing toner and each of the electrodes is large, so that the electrodes can not energize sufficiently the printing toner to securely set the printing toner on the printing drum. And since it is necessary for end surfaces of the electrodes and an end surface of the ceramic base plate to be on a plane, the electrodes and the ceramic base plate are combined with each other and the combination thereof is cut by a cutter to form a common plane of the end surfaces of the electrodes and the end surface of the ceramic base plate. When the combination of the electrodes and the ceramic base plate are cut by the cutter, the electrodes are removed from the ceramic base plate easily and the positions of the electrodes are changed. Therefore, a desired arrangement of the electrodes can not be obtained and a correct printing pattern can not be formed by the electrodes.

OBJECT AND SUMMARY OF THE INVENTION

The object of the present invention is to provide a printing machine in which the electrical contact resistance between the electrically conductive and magnetically inductive printing toner and each of the electrodes is small.

A printing machine according to the present invention, comprises electrically conductive and magnetically inductive printing toner, an array of electrode-needles contacting with the toner, each of the electrode-needles arranged apart from the adjacent electrode-needles in the array and individually energized in accordance with a desired printing pattern to electrify the toner communicating electrically with the energized electrode-needle, recording means including an electrically conductive portion and an insulating surface which extends on the electrically conductive portion and is arranged away from the array of electrode-needles to face thereto and to contact with the toner arranged between the electrode-needles and the insulating surface, the voltage applied to the electrically conductive portion being positive when the voltage applied to the energized electrode-needles is negative or the voltage applied to the electrically conductive portion being negative when the voltage applied to the energized electrode-needles is positive so that the toner electrified by the energized electrode-needle is attracted and attached to the insulating surface by the electrically conductive portion, the insulating surface moving in relation to the array of electrode-needles so that the toner is attached to an area of the insulating surface, magnetic means for attracting the magnetically inductive printing toner to form toner chains extending from the array of the electrode-needles to the insulating surface, and transferring means for transferring the toner from the insulating surface to a work piece, wherein longitudinally extending surfaces of the electrode-needles face to the insulating surface to electrify the printing toner arranged between the electrode-needles and the insulating surface.

Since the longitudinally extending surfaces of the electrode-needles face to the insulating surface to electrify the printing toner, each of the electrode-needles according to the present invention has a larger area with which the toner arranged between the electrode-needles and the insulating surface contacts, in comparison with an area of longitudinal end terminating surface of the electrode for electrifying the toner according to the prior-art. Since the area where the toner contacts with the each of the electrode is large, the electrical contact resistance between the electrically conductive and magnetically inductive printing toner and each of the electrodes is small, so that the electrical contact resistance is much smaller than the insulating resistance of the insulating surface and the voltage of the electrified toner is substantially equal to the voltage of the electrode-needles. Therefore, the electrified toner is securely attached to the insulating surface with coulombic force and a clear and correct printing pattern is formed on the insulating surface.

DETAILED DESCRIPTION OF PREFERRED EMBODIMENTS

Figure 1:
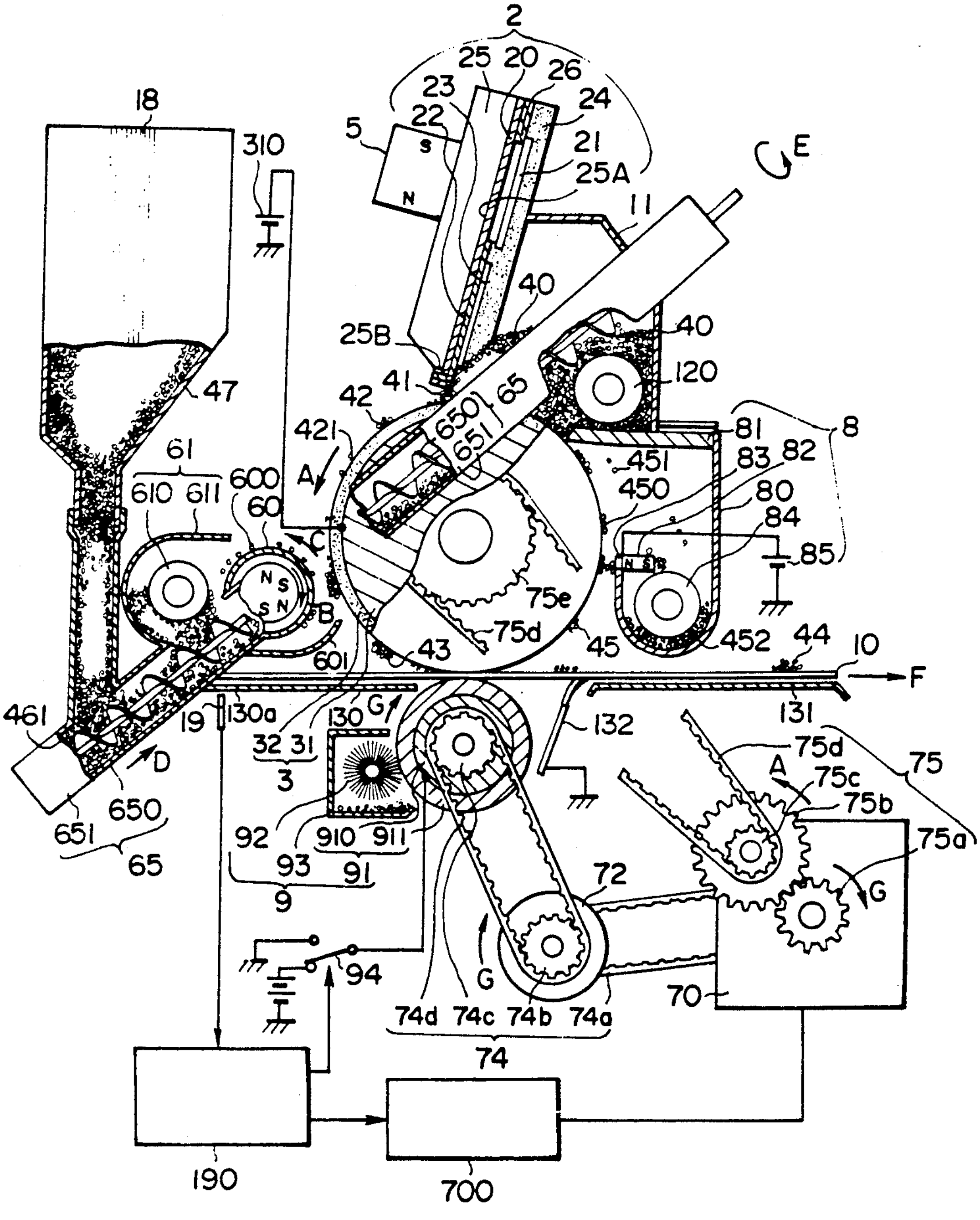
FIG. 1 is a partially cross-sectional view showing a printing machine according to the present invention.

As shown in FIG. 1, a recording drum 3 has a cylindrical shape and is rotated at a constant rotational speed by a toothed pully 75*e* which is coaxially attached to the recording drum 3 and is driven through a belt 75*d* by a motor 70 in a direction indicated by an arrow A. The motor 70 rotates a gear 75*a* fixed coaxially to the motor 70 and the gear 75*a* engages with a rotatable gear 75*b* to which a toothed pully 75*c* is fixed coaxially to drive the belt 75*d*.

The cylindrical recording drum 3 is made of, for example, aluminum or aluminum alloy and includes an electrically conductive portion 31 and an insulating layer 32 surrounding the electrically conductive portion 31 which is energized and in which the voltage applied to the electrically conductive portion 31 is positive when the voltage applied to the energized electrode-needles is negative or the voltage applied to the electrically conductive portion 31 is negative when the voltage applied to the energized electrode-needles is positive so that the toner electrified by the energized electrode-needle is attracted and attached to the surface of the insulating layer 32 by the electrically conductive portion. When the insulating layer 32 is formed, at first, a surface of the cylindrical recording drum 3 is polished to have very small roughness as a mirror and subsequently the polished surface of the cylindrical recording drum 3 is anodized so that the insulating hard layer 32 is formed. Since the anodized surface includes many small holes which may receive water, a substance of very low water-absorption coefficient and of very high electrically insulating resistance, for example, paraffin hydrocarbon, is inserted into the small holes of the anodized surface so that water is prevented from entering into the small holes and the electrically insulating resistance of the insulating layer 32 is not decreased by water and is kept at a high degree. A thickness of the insulating layer 32 is generally 2 to 100 μm.

Diameters of the small holes of the anodized surface vary in accordance with a kind of electrolytic solution used in the anodizing process. When the electrolytic solution is sulfuric acid, the diameters of the small holes are 200 to 600 angstroms. If the small holes are filled with a substance whose molecule size is smaller than the diameters of the small holes, for example, paraffin hydrocarbon, soda stearate and so forth, the spaces between the small holes and the substance inserted therein are substantially zero. If the anodized surface is coated with a substance whose molecule size is greater than the diameters of the small holes, for example, epoxy resins, acrylic resins, poly-imide, poly-amide, silicone, polycarbonate and so forth, water is prevented from entering into the small holes and the electrically insulating resistance of the insulating layer 32 is not decreased by water and is kept at a high degree, but, since the total amount of a thickness of the insulating layer 32 and a thickness of the coating substance is large and the electric field strength in the insulating layer 32 is small, the electrified toner contacting with the surface of the insulating layer 32 can not be strongly attracted by the coulombic force generated between the electrified toner and the electrically conductive portion 31 and the electrified toner can not be securely positioned on the surface of the insulating layer 32. Further, since the coating materials of epoxy resins, acrylic resins, polyimide, poly-amide, silicone, poly-carbonate have small hardness and small adhesive strength, the coating material with which the insulating layer 32 is coated is easily worn away or separates from the insulating layer 32, when the coated surface of the insulating layer 32 is pressed against a work piece so that the toner on the coated surface is transferred from the insulating layer 32 to the work piece.

Negative voltage of −1 to −5 V is applied to the electrically conductive portion 31 by a direct current supply 310. And an electrode unit 2 is arranged apart from the insulating layer 32 by 0.03 to 0.5 mm.

The electrode unit 2 has a base plate 25 made of nonmagnetic material, for example, aluminum alloy. A surface 25A of the base plate 25 extends parallel to an axis of the cylindrical recording drum 3 and a surface 25B thereof extends perpendicularly to the surface 25A and parallel to the axis of the cylindrical recording drum 3 and is arranged apart from the surface of the cylindrical recording drum 3 with a distance of 30 to 500 μm therebetween. A plane including the surface 25A does not pass the axis of the cylindrical recording drum 3.

An insulating plastic film 20 is adhered on the surfaces 25A and 25B so that an array of electrode needles 22 is fixed on the insulating plastic film 20. Each of the electrode needles 22 is made of, electrically conductive and preferably magnetically inductive material, is arranged away from the adjacent electrode needles with a constant distance in the direction parallel to the axis of the cylindrical recording drum 3 and extends perpendicularly to the axis of the cylindrical recording drum 3. When the electrode needles 22 are made of magnetically inductive material, the toner is attracted more strongly to the electrode needles 22 to be held between the electrode needles 22 and the surface of the cylindrical recording drum 3 in comparison with a case where the electrode needles 22 are not made of magnetically inductive material. The base plate 25 radiates the heat generated by integrated circuits 21.

Figure 2:
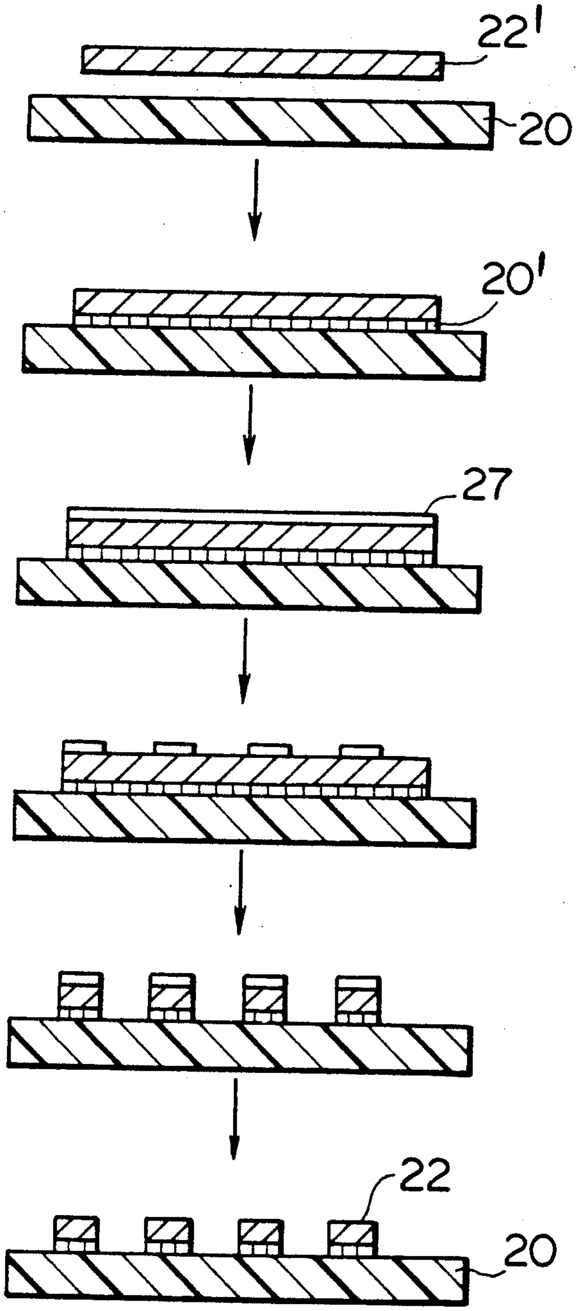
FIG. 2 is a cross-sectional view showing a steps of a method for manufacturing electrode-needles used in the printing machine according to the present invention.

When the array of the electrode needles 22 is manufactured, as shown in FIG. 2, at first, a metal layer 22' made of electrically conductive and magnetically inductive material, for example, permalloy or nickel alloy, is adhered by adhesive 20' on the insulating plastic film 20. Subsequently, resist 27 is applied onto the metal layer 22' and a fine pattern of the electrode needles 22 is formed by photo-etching process on the plastic film 20. The metal layer 22' on the insulating plastic film 20 may be formed by various metalizing process.

Figure 3:
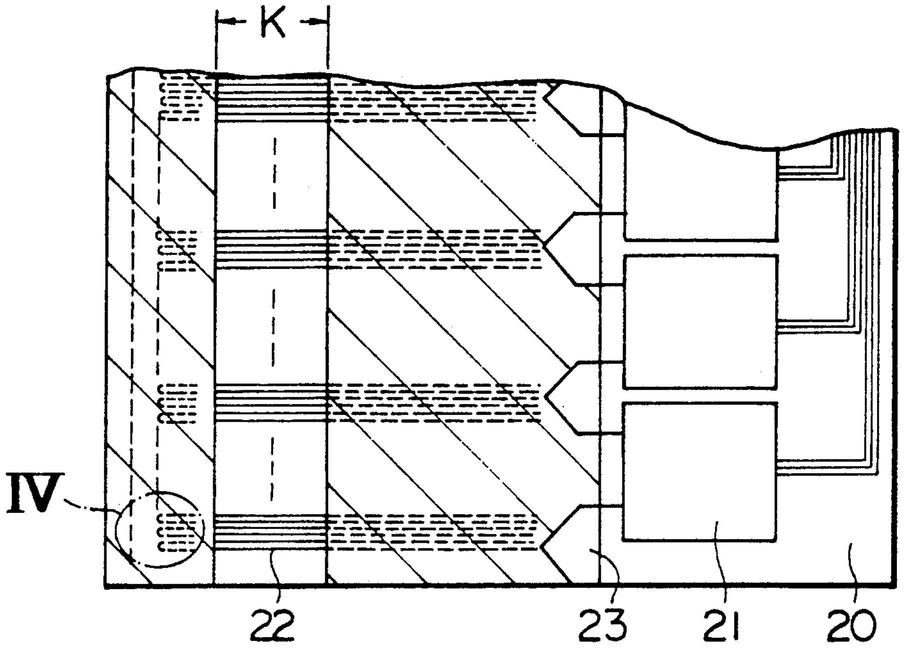
FIG. 3 is a plan view showing an unfinished product of an array of the electrode-needles according to the present invention.
Figure 4:
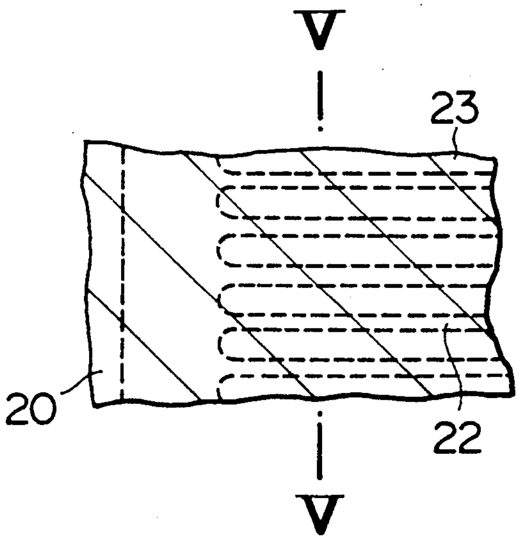
FIG. 4 is an enlarged plan view of a region indicated by B in FIG. 4.
Figure 5:
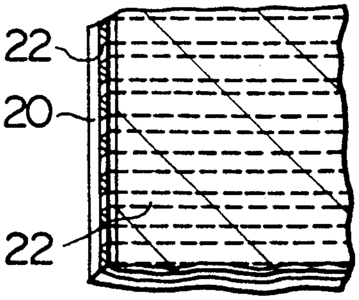
FIG. 5 is a perspective cross-sectional view taken on line A–A' of FIG. 4.

Thereafter, the driving integrated circuits 21 for applying a suitable voltage to the electrode needles 22 respectively in accordance with a desired printing pattern are fixed on the plastic film 20 and terminals of the driving integrated circuits 21 are electrically connected to the electrode needles 22 respectively through solder 26, as shown in FIG. 3. Subsequently, the greater part of the electrode needles 22 other than a part indicated by K is covered by an insulating plastic film 23 made of, for example, poly-imide. Since ends of the electrode needles 22 need to be connected to each other as shown in FIG. 4 when the array of the electrode needles 22 is formed in the photo-etching process, the ends of the electrode needles 22 between the plastic films 20 and 23 are cut along line A–A' of FIG. 4 so that the electrode needles 22 are electrically disconnected from each other as shown in FIG. 5 and each of the electrode needles 22 can be energized individually.

Figure 6:
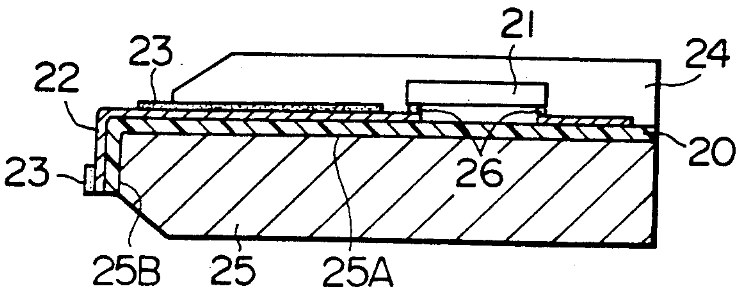
FIG. 6 is a longitudinally cross-sectional view showing an electrode unit according to the present invention.
Figure 7:
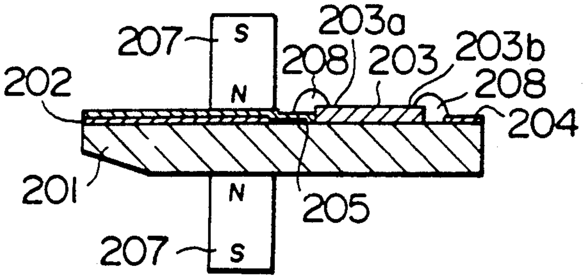
FIG. 7 PRIOR ART
FIG. 7 is a longitudinally cross-sectional view showing an example of electrode unit according to the prior art.
Figure 8:
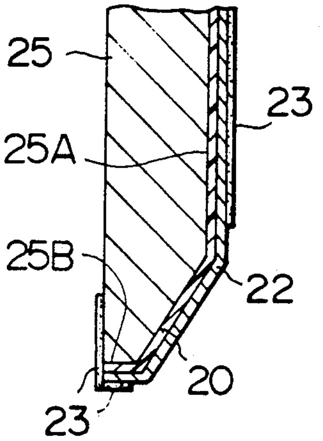
FIG. 8 is a cross-sectional view showing another embodiment of the electrode-needle according to the present invention.

Thereafter, the array of the electrode needles 22 on the plastic film 20 is bent and fixed onto the surfaces 25A and 25B through adhesive, as shown in FIGS. 6 and 8. Since longitudinally extending surfaces of the electrode needles 22 are not covered by the plastic film 23 to face to the recording drum 3 and preferably the longitudinally extending surfaces of the electrode needles 22 are bent and arranged at a corner between the surfaces 25A and 25B, the electrically contacting resistance between the toner and each of the electrode needles 22 is small. A chamfer may be arranged at the corner between the surfaces 25A and 25B, as shown in FIG. 8. And if the positions of the cut ends of the electrode needles 22 are changed during cutting operation, changes of positions of the longitudinally extending surfaces of the electrode needles 22 are smaller in comparison with those of the cut ends of the electrode needles 22. Since a part of each of the longitudinally extending surfaces of the electrode needles 22 faces to the recording drum 3 and a part of each of the longitudinally extending surfaces of the electrode needles 22 is supported on the base plate 25 through the plastic film 20, the part of the longitudinally extending surfaces facing to the recording drum 3 is securely supported on the base plate 25. A protecting member 24 made of insulating and nonmagnetic material covers a part of the array of the electrode needles 22 and the driving integrated circuits 21. A permanent magnet 5 (for example, a size of cross-section thereof is 10 mm×20 mm and a residual magnetic flux density thereof is 4000 gauss) extends over the longitudinal whole length of the array of the electrode needles 22.

A toner container 11 receives the electrically conductive and magnetically inductive toner 40 (whose average grain diameter is, for example, 14 μm and whose saturation magnetization is, for example, 50 emu/g). A screw 120 is arranged in the toner container 11 to agitate the toner and to distribute the toner constantly to the longitudinal whole length of the array of the electrode needles 22. The toner 41 is held between the array of the electrode needles 22 and the surface of the insulating layer 32 of the recording drum 3. The toner 42 and 421 are attached to the surface of the insulating layer 32.

A magnetic ring 60 is arranged parallel to the recording drum 3 between a transferring roller 91 and the electrode needles 22 so that the toner which moves away from the electrode needles 22 toward the transferring roller 91 and which is not attached securely to the surface of the insulating layer 32 is removed from the recording drum 3 by the magnetic ring 60. The magnetic ring 60 includes a plurality of permanent magnets polarized in the circumferential direction of the magnetic ring 60 and is rotated within a sleeve 600 made of nonmagnetic material in the direction indicated by an arrow B in FIG. 1. A distance between the magnetic ring 60 and the recording drum 3 is 0.2 to 3 mm. Since a cut-off part of the sleeve 600 extends longitudinally, the toner drops into a first toner feeding device 61 after the toner removed and attracted from the recording drum 3 by the magnetic ring 60 moves on the sleeve 600 in the direction C opposite to the rotational direction of the magnetic ring 60. Therefore, only the securely fixed toner remains on the surface of the insulating layer 32.

A toner receiver 601 extends under a space between the sleeve 600 and the recording drum 3. The first toner feeding device 61 extends along the magnetic ring 60 and the sleeve 600 to feed the dropped toner to a second toner feeding device 65. The first toner feeding device 61 includes a rotating screw 610 and a cover 611 surrounding the rotating screw 610. The second toner feeding device 65 feeds the toner to the toner container 11 in the direction indicated by an arrow D of FIG. 1 and includes a pipe 651 and a screw 650 rotating in the direction indicated by an arrow E of FIG. 1. A toner cartridge 18 is connected to a lower end of the second toner feeding device 65 and contains the toner 47.

A work piece 10 is, for example, a paper, and is contained by a work piece container (not shown). The work piece 10 is fed by a pick-up roller (not shown) arranged near the work piece container and is moved in the direction indicated by an arrow F of FIG. 1 through a resist roller (not shown) and guides 130 and 131. The guide 130 includes an opening 130*a* for a sensor 19 which detects the presence of the work piece. The sensor 19 is connected to a sensor-signal-processor 190 which controls the motor 70 through a driving circuit 700.

A transferring device 9 includes the transferring roller 91 whose rotational axis is parallel to the rotational axis of the recording drum and whose outer peripheral surface presses the work piece 10 against the outer peripheral surface of the recording drum 3 so that the toner 43 on the recording drum 3 is transferred onto the work piece 10. The transferring roller 91 includes a bar-shaped rigid roller 910 made of electrically conductive material and an elastic peripheral surface 911 which surrounds the bar-shaped rigid roller 910 and which is made of, for example, urethane rubber. The transferring device 9 further includes a brush 92 which contacts with the peripheral surface of the recording drum 3 and which is rotated to clean the peripheral surface of the transferring roller 91, a brush container 93 and a pressing mechanism (not shown) which presses the transferring roller 91 toward the recording drum 3 to press the work piece against the recording drum 3. The rotational direction of the transferring roller 91 rotated through a transferring roller driving device 74 by the motor 70 is contrary to the rotational direction of the recording drum 3 rotated through a recording drum driving device 75 by the motor 70.

The motor 70 rotates in the direction indicated by an arrow G of FIG. 1 to drive the recording drum 3 in the direction indicated by an arrow A and to drive a slip clutch 72 in the direction indicated by the arrow G through a toothed pully (not shown), the toothed belt 74*a* and a toothed pully (not shown) connected coaxially to the slip clutch 72 which transmits a torque within a predetermined degree and does not transmit a torque more than the predetermined degree. A driving torque input to the slip clutch 72 drives the transferring roller 91 in the direction indicated by the arrow G through a coaxial toothed pully 74*b*, the toothed belt 74*d* and a toothed pully 74*c* connected coaxially to the transferring roller 91.

The guide 131 extends along a tangent line extending from the contacting point between the recording drum 3 and the transferring roller 91 so that a part of the work piece which passed the transferring roller 91 is guided. A grounded brush 132 is arranged between the guide 131 and the transferring roller 91 and a forward end thereof contacts with the work piece 10 to discharge static electricity of the work piece 10. Hair of the grounded brush 132 extend with a suitable angle relative to the work piece 10 so that not compression but tension is applied to the hair by the work piece 10.

A drum cleaning device 8 is arranged in the vicinity of the peripheral surface of the recording drum 3 between the transferring roller 91 and the array of electrode needles 22 to remove the toner remaining on the recording drum 3 after most of the toner is transferred to the work piece by the transferring device 9. The drum cleaning device 8 includes a container 80 for containing the removed toner, a cleaning blade 81 which is made of electrically insulating and elastic material, for example, urethane rubber and is attached to the container 80 and whose forward end contacts with the longitudinal whole length of the peripheral surface of the recording drum 3 to remove the remaining toner, a remaining-toner electrifying electrode 83 which is arranged between the cleaning blade 81 and the transferring roller 91 and extends closely to the longitudinal whole length of the peripheral surface of the recording drum 3 and to which a direct current supply 85 always applies a voltage for electrifying the toner to be attracted toward the recording drum 3, a permanent magnet 82 for magnetizing the toner between the recording drum 3 and the remaining-toner electrifying electrode 83, and a rotating screw 84 which is arranged in the container 80 to feed the toner 452 therein.

Figure 9:
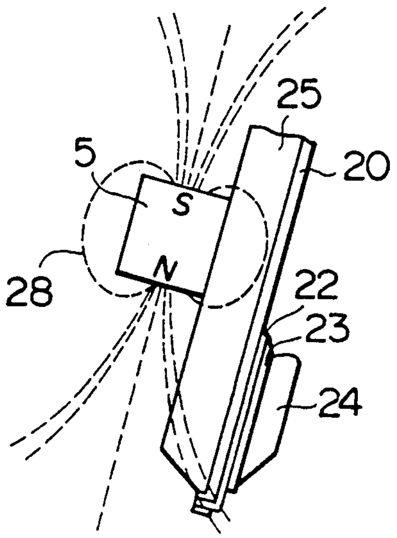
FIG. 9 is a schematic view showing an arrangement of line of magnetic force in the printing machine according to the present invention.

After the toner cartridge 18 filled with the toner is arranged, the toner 47 within the toner cartridge 18 descends from the toner cartridge 18 into the screw 650. When the screw 650 rotates in the direction indicated by the arrow E of FIG. 1 within the pipe 651, the toner 461 is fed by the second toner feeding device 65 to the toner container 11 in the direction indicated by the arrow D of FIG. 1. The rotating screw 120 distributes the toner 40 constantly to the longitudinal whole length of toner container 11. Subsequently, the distributed toner in the toner container 11 moves to the space between the array of the electrode needles 22 and the recording drum 3 in accordance with the rotation of the recording drum 3. A static magnetic field is generated at the space between the array of the electrode needles 22 and the recording drum 3 by the permanent magnet 5. If the electrode needles 22 are made of magnetically inductive material, the magnetic field strength is increased at the space between the array of the electrode needles 22 and the recording drum 3. The magnetic line of force by the permanent magnet 5 extends as shown in FIG. 9. Dotted lines indicate the directions of the magnetic line of force by the permanent magnet 5. Since the toner has magnetic inductivity, the toner 40 magnetized by the permanent magnet 5 forms toner chains extending between the array of the electrode needles 22 and the recording drum 3.

Each of the driving integrated circuit 21 applies the voltage of, for example, 10 to 50 volts to the electrode needle 22 in accordance with the printing pattern to electrify the toner 41 contacting with the energized electrode needle 22 and the toner contacting with the electrified toner 41. Since the attracting force of coulombic force is in proportion to a distance between electrified substances, the toner contacting with the surface of the insulating layer 32 is most strongly attracted to the recording drum 3. And since the thickness of the insulating layer 32 is small in comparison with the diameter of the toner, the attracting force applied to the toner directly contacting with the surface of the insulating layer 32 is largely different from the attracting force applied to the toner which contacts with the toner directly contacting with the surface of the insulating layer 32 and which does not directly contact with the surface of the insulating layer 32. Therefore, the toner directly contacting with the surface of the insulating layer 32 is securely fixed thereto, is cut off from the toner which does not directly contact with the surface of the insulating layer 32 and is moved toward the transferring device 91 with the rotation of the recording drum to form the printing pattern. After the toner which contacts directly with the surface of the insulating layer 32 and which has been included by the toner chains is apart from the toner chains, the toner which does not directly contact with the surface of the insulating layer 32 contacts immediately with the surface of the insulating layer 32 so that the toner chains are kept between the array of the electrode needles 22 and the recording drum 3.

If the toner 421 which is not electrified by the electrode needles 22 is attached to the surface of the insulating layer 32 and is moved toward the transferring device 91 with the rotation of the recording drum 3, the toner 421 is removed from the recording drum 3 by centrifugal force of the rotating recording drum 3, gravity of the toner 421 or magnetic force of the magnetic ring 60, so that only the toner 43 which is electrified by the electrode needles 22 remains on the surface of the insulating layer 32. The toner 43 remaining on the recording drum 3 is subsequently transferred by the transferring device 9 to the work piece 10 to form the printing pattern 44. The removed toner 421 is moved in the C direction by the rotation of the magnetic ring 60 and is fed to the toner container 11 through the screw 610, the screw 650 and the screw 120 to be reused.

The peripheral speed of the recording drum 3 is higher than the peripheral speed of the transferring roller 91 when the torque transmitted by the slip clutch 72 between the motor 70 and the transferring roller 91 is less than the predetermined degree and the slip clutch 72 does not slip. When the work piece 10 is not inserted between the transferring roller 91 and the recording drum 3, the transferring roller 91 contacts directly with the recording drum 3 and is pressed against it. Since the peripheral surface of the transferring roller 91 is made of elastic material of high frictional coefficient, a large frictional force is generated between the recording drum 3 and the transferring roller 91. Therefore, the slip clutch 72 slips so that the peripheral speed of the transferring roller 91 is made identical with the peripheral speed of the recording drum 3.

When the work piece 10 is inserted between the transferring roller 91 and the recording drum 3, the slip clutch 72 does not slip and the peripheral surface of the recording drum 3 slips on the work piece 10 driven by the transferring roller 91, because the frictional coefficient between the work piece 10 and the recording drum 3 is smaller than the frictional coefficient between the work piece 10 and the transferring roller 91. When the peripheral surface of the recording drum 3 slips on the work piece 10, the toner fixed thereon is rubbed into the work piece 10 so that most of the toner forming the printing pattern 44 is transferred to the work piece 10.

If the rigid roller 910 or the elastic peripheral surface 911 has high electrical conductivity and a removing voltage is applied by a switching circuit 94 to any one of them to attract the electrified toner 43 to the transferring roller 91 when the work piece 10 is inserted between the transferring roller 91 and the recording drum 3, that is, if the removing voltage is positive when the voltage of the electrified toner 43 is negative or the removing voltage is negative when the voltage of the electrified toner 43 is positive, the transferring of the electrified toner 43 from the recording drum 3 to the work piece 10 is accelerated by a coulombic force by the removing voltage. Subsequently, the toner 44 transferred to the work piece is securely fixed on the work piece 10 by a well-known thermally fixing device or pressure fixing device.

The toner remaining on the recording drum 3 after most of the toner forming the printing pattern 44 is transferred to the work piece 10 passes near to the remaining-toner electrifying electrode 83 of the drum cleaning device 8 with the rotation of the recording drum 3 and is electrified by the remaining-toner electrifying electrode 83 to be strongly attracted to the energized recording drum 3. The voltage of the remaining-toner electrifying electrode 83 is negative when the voltage energizing the recording drum 3 is positive or the voltage of the remaining-toner electrifying electrode 83 is positive when the voltage energizing the recording drum 3 is negative. In this case, the voltage of the remaining-toner electrifying electrode 83 is 10 to 50 volts and is identical with the voltage applied to the electrode needles 22. The toner 450 electrified by the remaining-toner electrifying electrode 83 is removed by the cleaning blade 81 from the recording drum 3 and the removed toner 451 descends and is received by the container 80. A part of the removed toner 451 reaches to a space between the recording drum 3 and the remaining-toner electrifying electrode 83 and is magnetized by the permanent magnet 82 and electrified again by the remaining-toner electrifying electrode 83 so that the grains of the magnetized toner are attracted to each other by the magnetic force and the electrified toner are attracted to the remaining-toner electrifying electrode 83. Therefore, the removed toner can not pass through the space between the recording drum 3 and the remaining-toner electrifying electrode 83 and does not drop onto the work piece 10. The toner 452 received by the container 80 is fed by the rotating screw 84 to a dumpage container.

If a sensor is arranged in the pipe 651 for detecting the presence of the toner 461, the necessity of exchange of the toner cartridge 18 can be known. If the sensor detects the presence of the toner 461 at two positions in the pipe 651, it is possible to output an advance notice and an alarm for the necessity of exchange of the toner cartridge 18.

The toner is supplied to the toner container 11 by the screw 650 from the toner cartridge 18 arranged at a lower portion of the second toner feeding device 65. When the sensor 19 arranged between the work piece container and the transferring roller 91 detects the presence of the work piece 10 just after the work piece 10 reaches the sensor 19 along the guide 130, the motor 70 driven by the driving circuit 700 begins to rotate at a predetermined rotational speed and the electrode needles 22 begin to electrify the toner in accordance with the desired printing pattern. At this time, the peripheral speed of the transferring roller 91 is identical with the peripheral speed of the recording drum 3, because of the slip of the slip clutch 72. A time needed for the movement of the work piece 10 from the position of the sensor 19 to the contacting point between the transferring roller 91 and the recording drum 3 is set to be identical with a time needed for the movement of the toner fixed on the recording drum 3 from the array of the electrodes 22 to the contacting point between the transferring roller 91 and the recording drum 3 so that a forward end of the work piece 10 reaches the contacting point between the transferring roller 91 and the recording drum 3 simultaneously with a forward end of the desired printing pattern formed by the electrified toner and the printing pattern can be transferred to the forward end of the work piece 10.

When the work piece 10 is inserted between the transferring roller 91 and the recording drum 3, the peripheral speed Vt of the transferring roller 91 is not identical with or smaller than the peripheral speed Vd of the recording drum 3 because of a small frictional force between the work piece 10 and the recording drum 3 and the work piece 10 is moved at the speed Vt because of a large frictional force between the work piece 10 and the transferring roller 91. When the sensor 19 detects the presence of the work piece 10 just after the work piece 10 reaches the sensor 19, the sensor-signal-processor 190 having a timer starts to count a time elapsing after the work piece 10 reaches the sensor 19. When a predetermined time has elapsed so that the forward end of the work piece 10 reaches the contacting point between the transferring roller 91 and the recording drum 3, the sensor-signal-processor 190 operates the switching circuit 94 to energize the roller 910 by, for example, −1 to −100 volts. The voltage applied to the roller 910 is positive when the voltage of the electrified toner 43 is negative or the voltage applied to the roller 910 is negative when the voltage of the electrified toner 43 is positive. When another predetermined time has elapsed so that a backward end of the work piece 10 reaches the contacting point between the transferring roller 91 and the recording drum 3, the sensor-signal-processor 190 operates the switching circuit 94 not to energize the roller 910. If the electrified toner on the recording drum 3 reaches the contacting point between the transferring roller 91 and the recording drum 3 before the work piece 10 reaches the contacting point between the transferring roller 91 and the recording drum 3 and the toner is attached to the transferring roller 91, the brush 92 removes the toner on the transferring roller 91 so that a back surface of the work piece 10 contacting with the transferring roller 91 is not made dirty.

When the recording drum 3 rotates, the screws 610, 650 and 120 rotate to supply the toner to the space between the array of the electrode needles 22 and the recording drum 3.

A forward end of the grounded brush 132 contacts with a part of the back surface of the work piece 10 to ground the work piece 10 after the part thereof passes the transferring device 9. Since an angle between a longitudinal axis of the grounded brush 132 and a part of the work piece 10 extending from the transferring device 9 to the forward end of the grounded brush 132 is acute, the forward end of the grounded brush 132 does not disturb the movement of the work piece 10. Therefore, the grounded work piece 10 is not attracted to the guide 131 and moves smoothly to the printing pattern fixing device.

What is claimed is:

1. A printing machine comprising, electronically conductive and magnetically inductive printing toner, an array of electrode-needles contacting with the toner, each of the electrode-needles arranged apart from the adjacent electrode-needles in the array and individually energized in accordance with a desired printing pattern to electrify the toner communicating electrically with the energized electrode-needle, recording means including an electrically conductive portion and an insulating surface which extends on the electrically conductive portion and is arranged away from the array of electrode-needles to face thereto and to contact with the toner arranged between the electrode-needles and the insulating surface, the voltage applied to the electrically conductive portion being positive when the voltage applied to the energized electrode-needles is negative or the voltage applied to the electrically conductive portion being negative when the voltage applied to the energized electrode-needles is positive so that the toner electrified by the energized electrode-needle is attracted and attached to the insulating surface by the electrically conductive portion, the insulating surface moving in relation to the array of electrode-needles so that the toner is attached to an area of the insulating surface, magnetic means for attracting the magnetically inductive printing toner to form the toner chains extending from the array of the electrode-needles to the insulating surface of the recording means, and transferring means for transferring the toner from the insulating surface to a work piece, wherein longitudinally extending surfaces of the electrode-needles face to the insulating surfaces to electrify the printing toner arranged between the electrode-needles and the insulating surface and the electrode-needles are bent so that the longitudinally extending surfaces face to the insulating surface in a plurality of directions.

2. A printing machine according to claim 1, wherein the electrode-needles are made of magnetically inductive material.

3. A printing machine according to claim 1, wherein the insulating surface is made of anodized aluminum or aluminum alloy and includes small holes and a substance of very low water-absorption coefficient and very high electrically insulating resistance inserted into the small holes of the anodized surface.

4. A printing machine according to claim 1, wherein the printing machine further comprises a drum cleaning device for removing the toner remaining on the insulating surface after most of the toner on the insulating surface is transferred to the work piece by the transferring means, the drum cleaning device including a cleaning blade which contacts with the insulating surface to remove the remaining toner, a remaining-toner electrifying electrode which is arranged between the cleaning blade and the transferring means and extends closely to the insulating surface and to which a voltage for electrifying the toner to be attracted toward the recording means is applied, the voltage applied to the remaining-toner electrifying electrode being negative when the voltage applied to the energized electrode-needles is negative or the voltage applied to the remaining-toner electrifying electrode being positive when the voltage applied to the energized electrode-needles is positive, and a permanent magnet for magnetizing the toner between the recording means and the remaining-toner electrifying electrode.

* * * * *